No. 687,848. Patented Dec. 3, 1901.
O. A. MYGATT.
PRISM GLASS GLOBE OR SHADE.
(Application filed Apr. 11, 1901.)
(No Model.) 2 Sheets—Sheet 1.
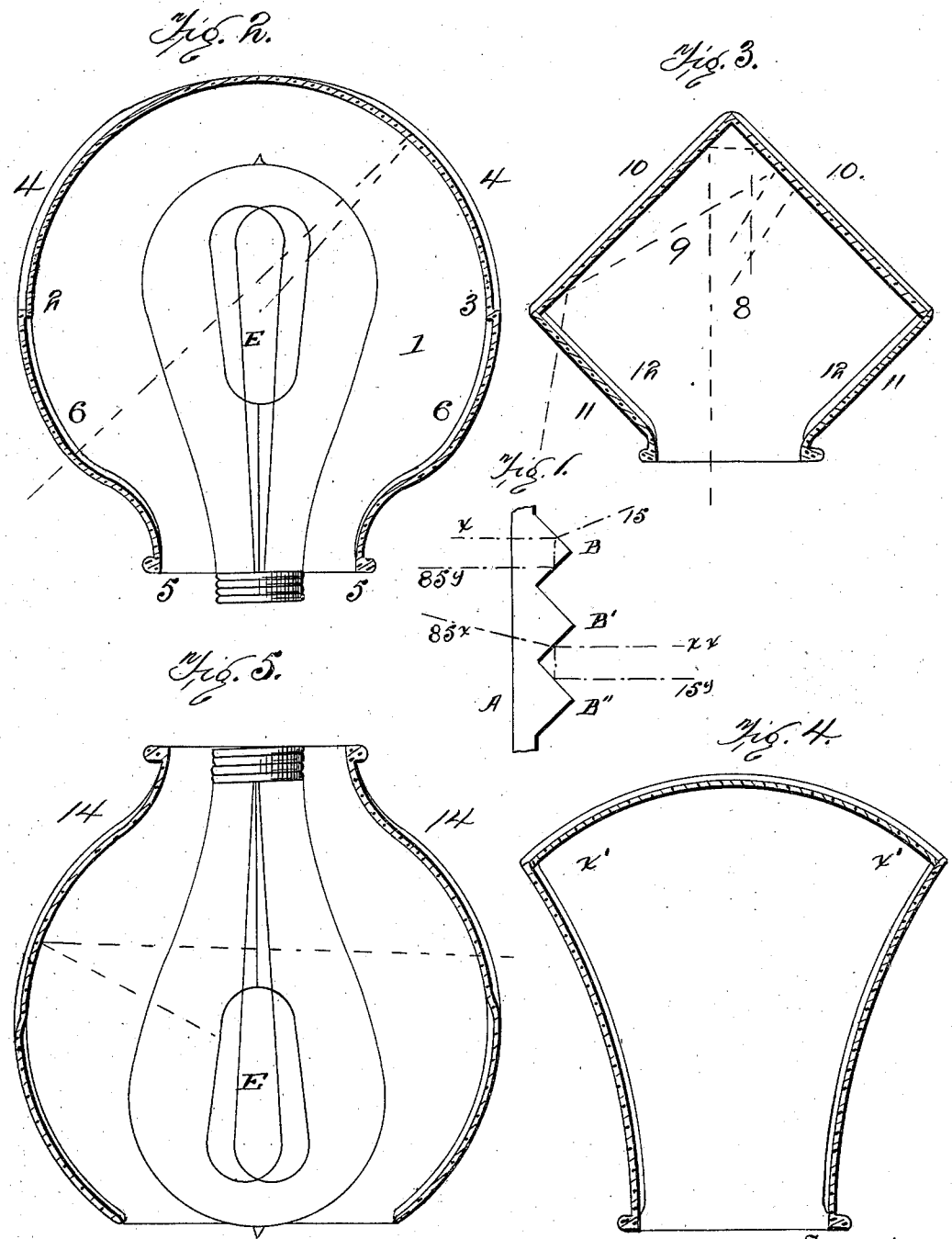

No. 687,848.  
Patented Dec. 3, 1901.  
O. A. MYGATT.  
PRISM GLASS GLOBE OR SHADE.  
(Application filed Apr. 11, 1901.)  
(No Model.) 2 Sheets—Sheet 2.
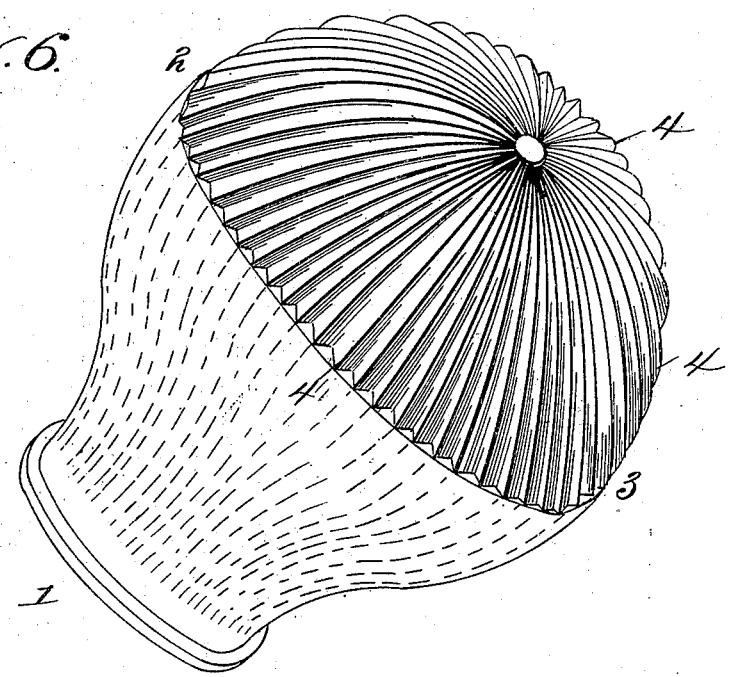
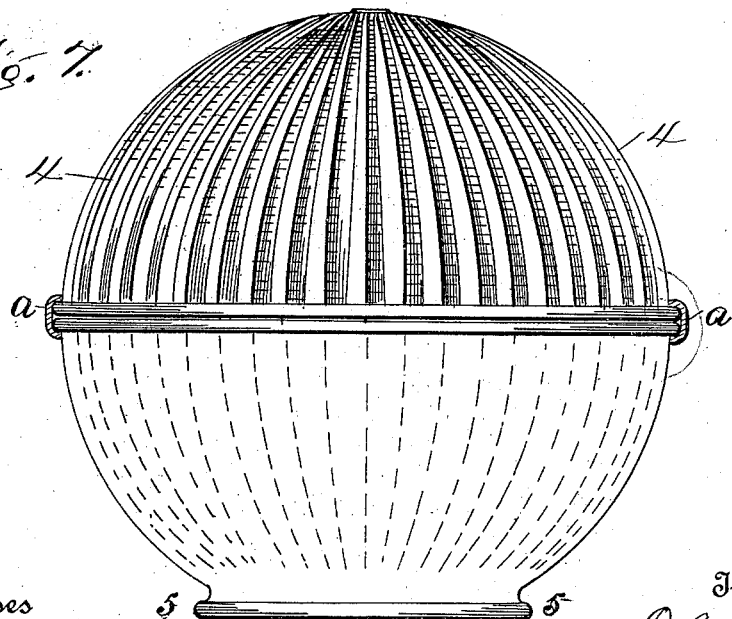

UNITED STATES PATENT OFFICE.

OTIS A. MYGATT, OF NEW YORK, N. Y.

PRISM-GLASS GLOBE OR SHADE.

SPECIFICATION forming part of Letters Patent No. 687,848, dated December 3, 1901.

Application filed April 11, 1901. Serial No. 55,343. (No model.)

*To all whom it may concern:*

Be it known that I, OTIS A. MYGATT, residing at New York, in the county of New York and State of New York, have invented certain new and useful Improvements in Prism-Glass Globes or Shades, of which the following is a specification, reference being had therein to the accompanying drawings.

This invention relates to prism-glass globes or shades.

The object of the invention is to make prism-glass globes which will concentrate and diffuse light in a downward direction and which will be little affected by dust and dirt accumulated thereon.

Figure 1 is a diagram illustrating the course of light-rays to and from a prism on a piece of glass from opposite sides thereof. Fig. 2 is a section of a globe according to this invention with an electric light inclosed. Fig. 3 is a section of a conical or frusto-conical shade of prism-glass. Fig. 4 is a section of a form of shade with concavo-convex top and sides—that is, the top is somewhat flattened as compared with Fig. 2 and the sides curved inwardly from said top instead of curving outwardly and then inwardly. Fig. 5 is a section of a shade with reflecting and refracting ribs in reverse position from that of Fig. 1. Fig. 6 is a perspective of the globe, Fig. 2, showing outer prisms in full lines and indicating inner ribs in dotted lines. Fig. 7 is a side elevation of a two-piece globe. The parts are held together by any usual clamp, as $a\ a$.

In the diagram Fig. 1 I illustrate diagrammatically the course of rays of light striking the faces of prisms from different directions. Thus let A indicate a piece of glass having prisms B B' B'' on one face thereof. Now let us suppose a ray of light to emanate from point $x$. The dotted line indicates the direction of the light. At the plane face of the glass the light entering the glass at an angle of ninety degrees is not reflected to any considerable extent and is not refracted. Encountering the inner face of the prism B, if at an angle of forty-five degrees, some fifteen per cent. of the light will be refracted and pass from the outer face of the prism mainly in the direction of the line 15. As much as eighty-five per cent. of the light may be reflected across the body of the prism to the inner surface of the next face and then again reflected back in the direction of the line $y$, where as much as eighty-five per cent. of the light may be found to proceed in the direction of the line $85^y$. The quantity of light which will be reflected back on a line parallel with line $x$ depends on the angle of the surfaces of prism B. The best reflecting-angle is forty-five degrees. For the purpose of use of the light reflected to $y$ it is not very material whether the outer face of the prism B is clean or dirty. The reflection is from the inner face of the prism. There may be even a greater reflection of light in the direction of $85^y$ if the outer face of prism B be covered with dust or dirt. Of course in such case the light refracted in the direction 15 will be cut off more or less. Now suppose a light-ray to emanate from point $x\ x$ and to encounter the outer surface of the prism B' first at the same angle, forty-five degrees, heretofore supposed. Instead of reflecting eighty-five per cent. of the light as much as eighty-five per cent. may penetrate the glass, being refracted in the direction approximately on the line $85^x$. Some fifteen per cent. may be reflected across the space between prisms B' and B'', and so in the line $15^y$ return in a line parallel to the line $x\ x$, and if the faces of prisms B' and B'' be dusty the effect of reflection and refraction both may be greatly reduced. It does not require demonstration to prove that a smooth surface may be kept clean and free from dust more easily than a ribbed or rough surface. It can be demonstrated that in an article like a lamp shade, reflector, or globe the dust gathers more extensively on the upper surface than on the lower surface. Availing myself of these principles and laws controlling natural forces and objects, I construct lamp shades, globes, or glass reflectors in such manner that the upper surface thereof shall act mainly as a reflector in general downward direction. Light which passes upward from an artificial light is generally of little utility, since most lights, unless it be footlights at a theater, are intended to illuminate in a direction generally downward. Now let us take the globe 1 in Fig. 2. The upper portion—say approximately a hemisphere—is smooth on its inner surface—say from 2 to 3. The outer surface has ribs or prisms 4 4 thereon, these ribs being reflecting-prisms and extending in the direction of meridians or lines from the center or top of the dome. These ribs or prisms are in the form of lunes triangular in cross-section, radiating from a common center or point either actual, as in Figs. 2 and 3, or theoretical, as in Fig. 4, and increasing in width and in height as they approach the largest diameter of the globe, it being desirable to maintain the faces of the prisms at the best angle for reflection of the rays from the interior of the globe, which, as has been stated, is approximately the angle of forty-five degrees. Where the top of the globe is open, as in Fig. 5, the external reflecting-prisms will of course be truncated; but the boundary of these prisms, as shown, is on meridianal lines and the projection is proportioned to the breadth of the lunes. As shown in the perspective view, Fig. 6, the ribs 4 grow wider and thicker as they recede from the center of the globe, so as to maintain the proper reflecting-angle. For convenience of illustration the prisms are shown to terminate abruptly at their outer ends; but in practice the ends of the prisms are preferably not abrupt. The inside of the upper portion of the globe is smooth, so that the light-rays shall not be diffused in the upper part of the globe, but are reflected therefrom to a very great extent. The inside of the lower portion of the globe is ribbed in a manner similar to the internal ribs described in the patent of Blondel et al., No. 563,836, dated July 14, 1896; but the outer face of this lower portion is smooth, unlike the device of Blondel. It should be understood by every expert in the art of illumination that every rib or prism on a glass shade has some effect on the light-rays passing through the shade. That what such effect shall be depends not only on the form, but on the location of the rib with reference to the source of light. The reflecting-prisms arranged exteriorly of a shade, each prism forming a triangle, with its external plane faces at about the angle of forty-five degrees to the line of light-rays from within, I believe to be original with me. Other features of my shade I know to be old in other relations, but not in the combinations herein set forth in my claims. Now suppose an electric lamp E be inclosed in the shade in the manner indicated in Fig. 2. It is manifest that the light-rays passing upward will be largely reflected back from the inner surface of these ribs 4, and if the outer surface of the globe is dusty or dirty this reflection is not diminished. It is also apparent that under most conditions the smooth inner surface of the hemisphere 2 3 will remain free from dust much longer than the outer surface, since dust falls downward from the under surface before accumulating to a great extent. Now let us suppose the lower section of the globe to be provided with ribs 6 6 on its inner surface from the line 2 3 to the line 5 5. The light emanating from the bulb E and passing directly to these ribs or prisms, as well as the light reflected to them from the upper hemisphere, is mainly refracted and transmitted through the glass and passes in a downward direction, its diffusion and direction being largely determined by the form of the prisms 6, which, like the prisms 5, extend in generally vertical direction, as meridians on the globe. The outer lower surface of the globe being smooth will not readily accumulate dust. The inner ribbed surface is largely protected by the bulb E from the entrance of dust. Thus an effective shade and reflector is formed which is to a large extent self-cleaning or independent of dust conditions.

The semispheres or hemispheres of transparent glass can be easily pressed separately and the parts afterward secured together, or the globe may be pressed in one piece, with its open mouth expanded and afterward drawn in by heating the glass and again pressing without a core or tooling down; but however manufactured the device as described forms a most efficient shade and reflector.

In Fig. 3 a shade 8 is shown with an upper cone 9, smooth on its inner surface and having outside reflecting-prisms 10 10, said prisms extending in generally vertical direction and having their outer faces, and consequently their inner reflecting-faces, arranged as nearly at an angle of forty-five degrees to the light from within as may be—that is, reflecting-prisms. The lower frustum being ribbed internally with radiating or diffusing prisms 12 12, extending in vertical direction, serves to diffuse the light in outward and downward direction.

Fig. 5 shows a globe embodying the same principles, but not merely the globe 1 turned over. The ribs 14 on the outer and upper sides of the globe are on the opposite face of the glass from what would be the position of ribs 6 if globe 1 were turned over, and so with the ribs of the lower section.

Fig. 5 shows a form of shade and reflector in which the upper portion above line $x\ x$ has outside reflecting-ribs and the lower portion below line $x\ x$ has inner diffusing or refracting prisms.

The general principles of the present invention are explained above. It should be apparent that the modifications of form of my invention may be quite numerous.

As more sharply defined prisms can be made on the pressed glass when the glass is to remain in the form it comes from the mold, I prefer to make the globes in two pieces where the form of the globe is such as to require any considerable change of form after molding. It is not difficult to connect the sections of a two-piece globe either by a metallic band, by clamps, or by other usual and known means.

While it has been explained that a small accumulation of dust on the upper surface of such a globe as has been described is not necessarily detrimental to the reflection of light, it will readily be understood that there is much less likelihood of such an accumulation than if the ribs ran circumferentially of the globe, and this is even more true as to the inner vertical ribs as compared with circumferential ribs in a similar location.

What I claim is—

1. A lamp shade or globe of transparent glass having its upper portion practically covered by external prisms arranged in a generally vertical direction and each formed to reflect light coming from inside the globe back into the globe, the inside of this part of the globe being smooth, and having the lower globe portion provided with diffusing-prisms only.

2. A lamp shade or globe of transparent glass having its upper outer surface practically covered by reflecting-prisms extending in generally vertical direction and arranged to reflect light-rays coming from inside the globe back into the globe, the inner surface of this part of the globe being smooth, said globe having its inner lower portion provided with generally vertical diffusion-prisms and the outer face of this portion of the globe smooth, substantially as described.

3. A two-piece lamp-globe having its upper section provided with generally vertical external reflecting-ribs and having a smooth inner surface, and the lower section provided with internal generally vertical diffusion-prisms and a smooth outer face, and means for securing the sections together, substantially as described.

In testimony whereof I affix my signature in presence of two witnesses.

OTIS A. MYGATT.

Witnesses:
VALENTINE COOK, Jr.,
A. T. PENTECOST.